US008526590B2

(12) United States Patent
Pearson

(10) Patent No.: US 8,526,590 B2
(45) Date of Patent: *Sep. 3, 2013

(54) DISTINCTIVE CALL WAITING BASED ON A REDIRECTING NUMBER

(75) Inventor: Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/638,250

(22) Filed: Dec. 15, 2009

(65) Prior Publication Data

US 2010/0091973 A1     Apr. 15, 2010

Related U.S. Application Data

(63) Continuation of application No. 10/705,766, filed on Nov. 10, 2003, now Pat. No. 7,742,589.

(51) Int. Cl.
*H04M 3/42* (2006.01)

(52) U.S. Cl.
USPC .................. 379/207.16; 379/211.02

(58) Field of Classification Search
USPC ... 379/88.19, 207.16, 211.02, 221.08–221.09
See application file for complete search history.

(56) References Cited

U.S. PATENT DOCUMENTS

| 4,893,336 | A | * | 1/1990 | Wuthnow | ................. | 379/211.02 |
| 5,353,331 | A | | 10/1994 | Emery et al. | | |
| 5,469,496 | A | | 11/1995 | Emery et al. | | |
| 5,904,013 | A | | 5/1999 | Greenspan et al. | | |
| 5,926,537 | A | | 7/1999 | Birze | | |
| 5,960,363 | A | * | 9/1999 | Mizikovsky et al. | ...... | 455/550.1 |
| 5,995,839 | A | | 11/1999 | Coursey et al. | | |
| 6,091,949 | A | | 7/2000 | Sanchez | | |
| 6,130,938 | A | | 10/2000 | Erb | | |
| 6,185,427 | B1 | | 2/2001 | Krasner et al. | | |
| 6,188,888 | B1 | | 2/2001 | Bartle et al. | | |
| 6,208,854 | B1 | | 3/2001 | Roberts et al. | | |
| 6,301,350 | B1 | | 10/2001 | Henningson et al. | | |
| 6,320,534 | B1 | | 11/2001 | Goss | | |
| 6,332,021 | B2 | | 12/2001 | Latter et al. | | |
| 6,362,778 | B2 | | 3/2002 | Neher | | |
| 6,373,817 | B1 | | 4/2002 | Kung et al. | | |
| 6,404,858 | B1 | | 6/2002 | Farris et al. | | |
| 6,411,704 | B1 | | 6/2002 | Pelletier et al. | | |

(Continued)

OTHER PUBLICATIONS

"Verb Exchange Service—Tagline—One number gets me everywhere," published Nov. 5, 2003; originally retrieved at <<www.verbx.com/srv/service_tagline.html>>: 1 page.

(Continued)

*Primary Examiner* — Rasha Al Aubaidi
(74) *Attorney, Agent, or Firm* — Toler Law Group, PC

(57) ABSTRACT

A method includes receiving a query message at a controller communicatively coupled to a destination device. The query message includes inbound call data associated with a call to the destination device. The method includes determining that the call to the destination device is from a redirecting number based on the inbound call data. The redirecting number is compared to an authorized set of numbers. When the authorized set of numbers includes the redirecting number, the controller formulates a response message to the query message. The response message includes a distinctive tone for use at the destination device that is identified based on the redirecting number. The response message is sent as a reply to the query message.

18 Claims, 5 Drawing Sheets

(56) References Cited

U.S. PATENT DOCUMENTS

| | | | |
|---|---|---|---|
| 6,411,802 | B1 | 6/2002 | Cardina et al. |
| 6,424,840 | B1 | 7/2002 | Fitch et al. |
| 6,480,593 | B1 | 11/2002 | Munday et al. |
| 6,516,060 | B1 | 2/2003 | Foladare et al. |
| 6,574,470 | B1 | 6/2003 | Chow et al. |
| 6,587,475 | B1 | 7/2003 | Przygienda |
| 6,738,466 | B1 | 5/2004 | LaPierre et al. |
| 2002/0198007 | A1 | 12/2002 | Zimmerman |
| 2004/0208304 | A1* | 10/2004 | Miller .................. 379/210.02 |
| 2005/0047565 | A1 | 3/2005 | Nassimi |
| 2006/0104434 | A1 | 5/2006 | Nguyen et al. |

OTHER PUBLICATIONS

Zbar, Jeff, "Follow-me phone service keeps remote worker tethered to clients, co-workers," NetworkWorldFusion, published Aug. 26, 2002, originally retrieved at <<http://www.nwfusion.com/net.worker/columnists/2002/0826zbar.html>>, 3 pages.

"Follow-Me Phone," published Nov. 5, 2003, originally retrieved at <<www.officescape.com/services.asp>>, 1 page.

Callagenix, "Call Diversion Service," Published Mar. 2003, originally retrieved at <<www.callagenix.com/services/diversion.html, 3 pages.

Gupta, Puneet, "Short Message Service: What, How and Where?", Wireless Developer Network, originally retrieved at <<www.wirelessdevnet.com/channels/sms/features/sms.html>>, 7 pages, Nov. 15, 2003.

Webopedia, "Short Message Service," published Jul. 8, 2003, originally retrieved at <<www.webopedia.com/TERM/S/Short_Message_Service.html>>, 3 pages.

"Cellular Phone and Roaming Service," published Jul. 8, 2003, originally retrieved at <<www.members.tripod.com/peacecraft/infomining/cellphon.htm, 19 pages.

* cited by examiner

DISTINCTIVE CALL WAITING BASED ON A REDIRECTING NUMBER

CLAIM OF PRIORITY

This application is a continuation application of, and claims priority to, U.S. patent application Ser. No. 10/705,766, filed Nov. 10, 2003, the contents of which are expressly incorporated herein by reference in their entirety.

FIELD OF THE DISCLOSURE

The present disclosure relates generally to a system and method of applying a distinctive type of call waiting tone based on a redirecting number.

BACKGROUND

Distinctive ringing on telephones has been used to alert called parties of a particular type of call, such as when callers dial different telephone numbers than a main number. Distinctive call waiting uses a called number to determine a particular ring tone to use. An example of distinctive call waiting is in a household setting where each household member is assigned one of a set of numbers. When calls come into the main number, an inbound call is signaled by a normal ring tone or by a normal call waiting tone if the line is in use. If a call comes to one of the additional telephone numbers, the ring or call waiting tone is different than the normal ring or call waiting tone to identify that the call is for one of the children, instead of the parents. Based on the particular ring or call waiting tone, one of the children would answer the phone.

A person may forward their work phone number and/or their mobile phone to distinct numbers, such as a second or third phone number subscribed to at their residence. In this scenario, the mobile phone and the work phone could have different distinctive ring or call waiting tones assigned to such incoming call forwarded calls, given that they are forwarded to distinct numbers, such as a second or third subscriber phone numbers. A problem with this approach is misdialed and telemarketing calls. A called party may answer the call thinking it is a call from work and instead receive a telemarketing call. Customers find this problem irritating and confusing. Also, the personalized ring feature uses added phone numbers and leads to a scarcity of available phone numbers for a particular region. Severe phone number shortages could occur in certain market areas, resulting in undesirable area code splits or overlays.

DETAILED DESCRIPTION

In a particular embodiment, a method includes receiving a query message at a controller communicatively coupled to a destination device. The query message includes inbound call data associated with a call to the destination device. The method includes determining that the call to the destination device is from a redirecting number based on the inbound call data. The redirecting number is compared to an authorized set of numbers. When the authorized set of numbers includes the redirecting number, the controller formulates a response message to the query message. The response message includes a distinctive tone of a plurality of distinctive tones to use at the destination device that is identified based on at least the redirecting number. The response message is sent as a reply to the query message.

In another particular embodiment, a system includes a switching control point and a service switching point coupled to the switching control point. The service switching point is configured to send a request message to the switching control point that includes at least a redirecting number and a destination number. The switching control point is configured to send a response message to the service switching point in response to the request message. The response message identifies a distinctive tone of a plurality of distinctive tones to use at a destination device associated with the destination number. The distinctive tone is identified based on at least the redirecting number.

In another particular embodiment, a system is disclosed that includes a call facilitating module and a call logic module coupled to the call facilitating module. The call facilitating module is configured to send a request message to the call logic module that includes at least a redirecting number and a destination number. The call logic module is configured to send a response message to the call facilitating module. When the destination device is not in use, the response message identifies a distinctive ring tone of a plurality of distinctive ring tones to apply to a destination device associated with the destination number. The distinctive ring tone is determined based on at least the redirecting number. In one embodiment, when the destination device associated with the destination number is in use, the response message identifies a distinctive call waiting tone of a plurality of distinctive call waiting tones to apply to the destination device associated with the destination number. The distinctive call waiting tone is determined based on at least the redirecting number.

Figure 1:
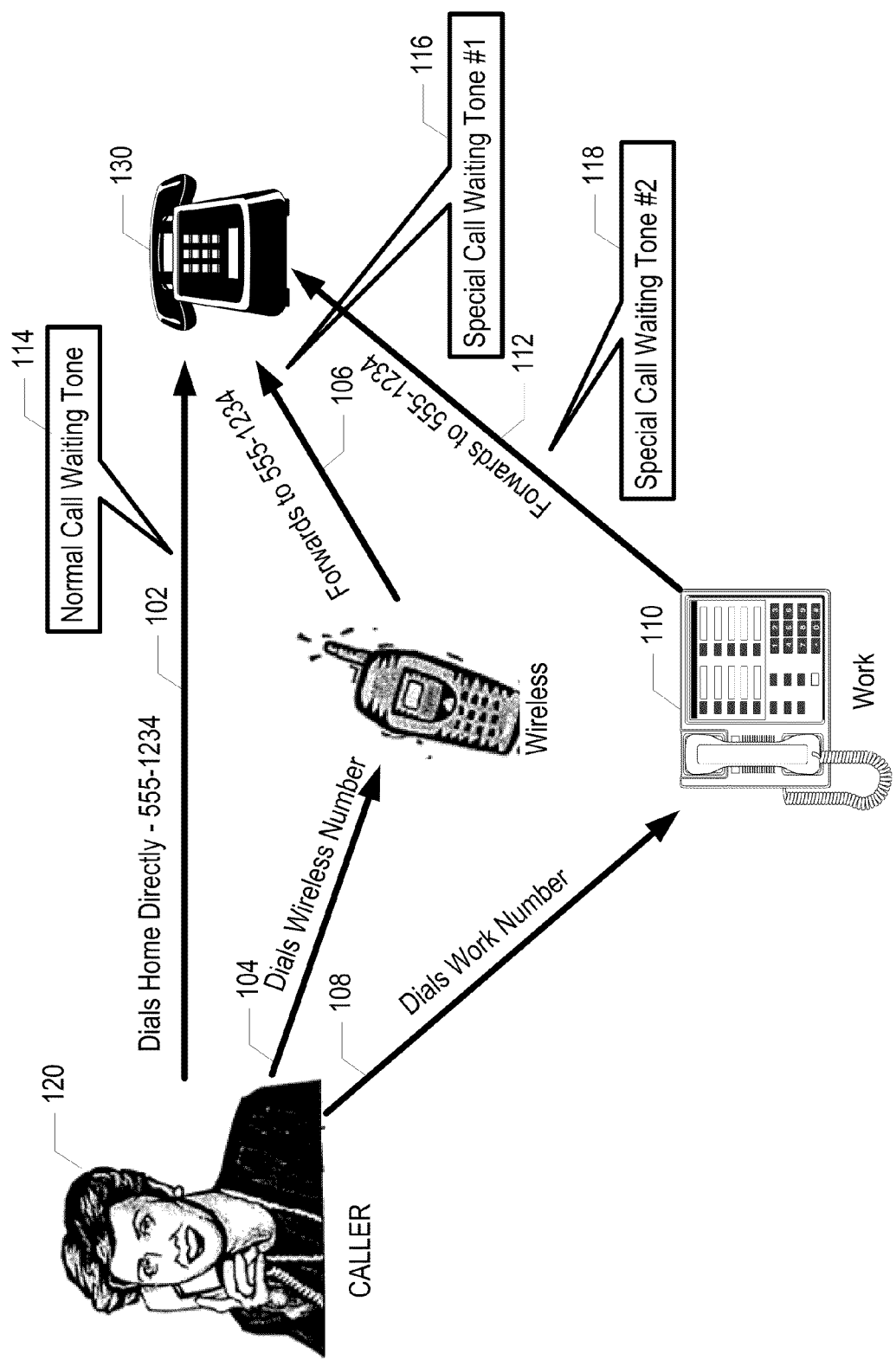
FIG. 1 is a general diagram that illustrates call forwarding and distinctive call waiting tones.

Referring to FIG. 1, an illustration of call paths from a caller 120 to a destination phone 130 is shown. A first call path 102 is from the caller 120 to the called party 130. A second call path 104 is from the caller 120, through a wireless phone and then forwarded over a redirected call path 106 to the destination phone 130. A third call path 108 is from the caller 120, through a work phone, and then forwarded over a redirected call path 112 to the destination 130. A first special call waiting tone 116 is applied upon receipt of a call at the destination 130 when the call is from the second call path 104. Similarly, a second special call waiting tone 118 is applied to the phone 130 upon receipt of a forwarded call via the third call path 108. The first special tone 116 and the second special tone 118 allows a called party at the destination 130 to determine whether a redirecting device is, for example, the subscriber's work phone or mobile phone.

Figure 2:
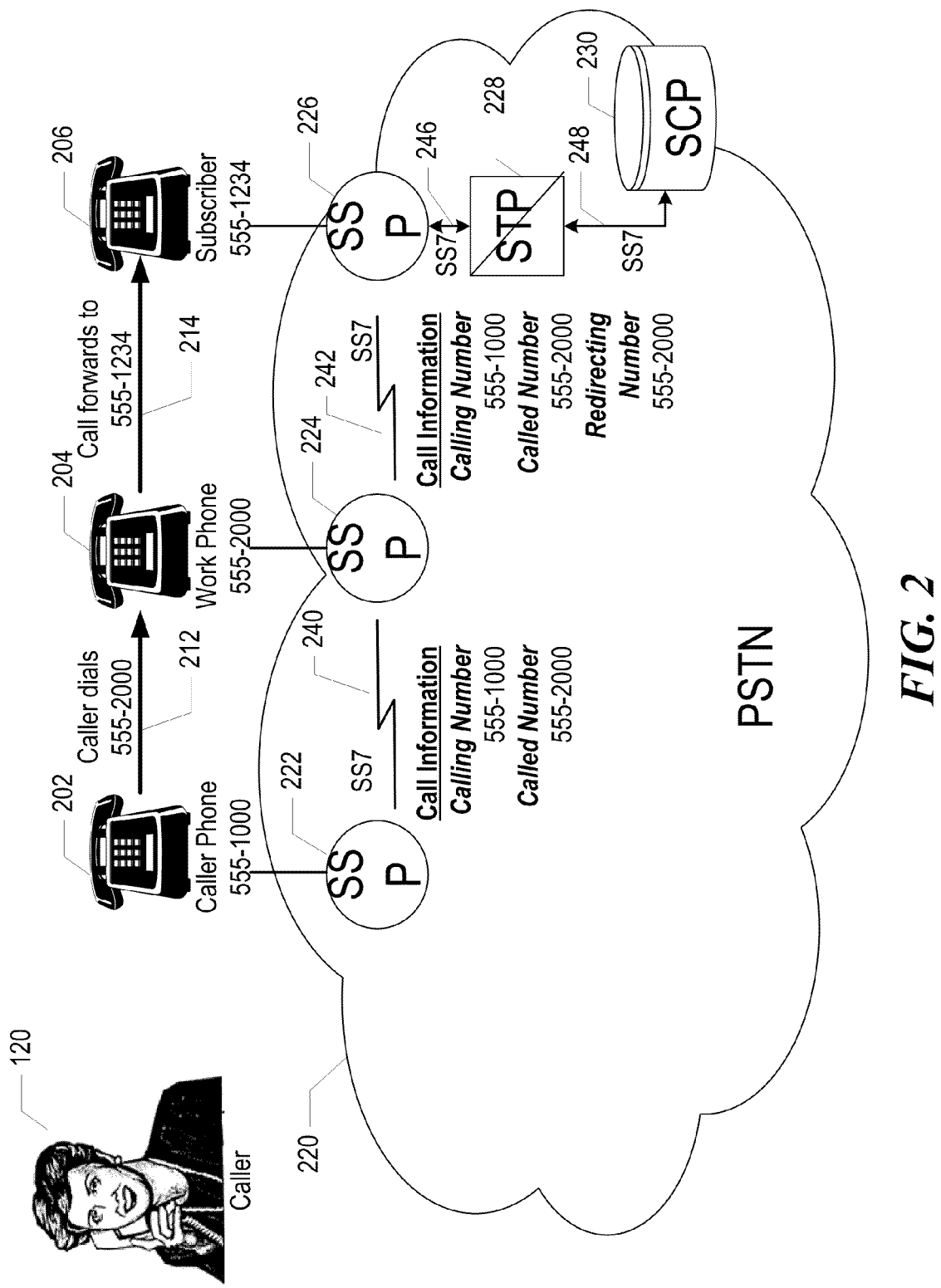
FIG. 2 is a general diagram that illustrates a system for handling call forwarding using a redirecting number.

Referring to FIG. 2, a system 220 for handling forwarded calls is shown. The system 220 includes a first service switching point (SSP) 222, a second SSP 224, and a third SSP 226. The system also includes a switching control point (SCP) 230 and a switch transfer point 228. The third SSP 226 is coupled to the SCP 230 via the STP 238 and via signaling system 7 (SS7) communications links 246 and 248. The second SSP 224 is coupled to the first SSP via SS7 link 240. The third SSP 226 is coupled to the second SSP 224 via SS7 link 242. The first SSP 222 corresponds to a caller phone 202 that is responsive to the caller 120. The second SSP 224 corresponds to an intermediate phone, such as work phone 204 having illustrative phone number "555-2000". The third SSP 226 corresponds to a destination subscriber device 206, such as a home telephone at a sample residential phone number "555-1234". The SSP may be implemented as a central office switch, such as class 5 switch and the subscriber's switch would typically support AIN version 0.1 or higher. The STP is used to route messages between SSPs, SCPs and IPs using the SS7 signaling protocol. The advanced intelligent network (AIN) service control point (SCP) provides programming logic to direct call control.

During operation, a caller 120 dials the work phone number "555-2000", at call path 212. This call is then forwarded by placing a second call along path 214 at number "555-1234" to reach the end subscriber device 206. Associated with the first call leg 212, the first SSP 222 sends data including the calling number and the called number over the SS7 link 240 to the second SSP 224. For the second call path 214, the second SSP 224 sends added information to the third SSP 226 via the SS7 link 242. For example, the SSP 224 sends calling number, the called number, and a redirecting number. In this case, the redirecting number is "555-2000" since this number is associated with the forwarding work phone 204. The third SSP 226 receives the data from the second SSP 224 including receiving the redirecting number. The data redirecting number and other call information is then passed to the SCP 230 via the STP 238. The SCP 230 includes logic that determines the particular distinctive ringing or call waiting tone to be applied to the subscriber device 206 based upon the redirecting number. The SCP 230 returns an instruction to the third SSP 226 directing the SSP 226 to apply the particular distinctive ring or call waiting tone associated with the redirecting number to the end subscriber device 206. Thus the subscriber will hear a different ringing or call waiting tone based on the intermediate forwarding telephone (e.g., cell phone or work phone). In addition, the illustrated method avoids the issue of assigning a different telephone number such as for the conventional personalized ringing feature where multiple phone numbers are typically required.

Figure 3:
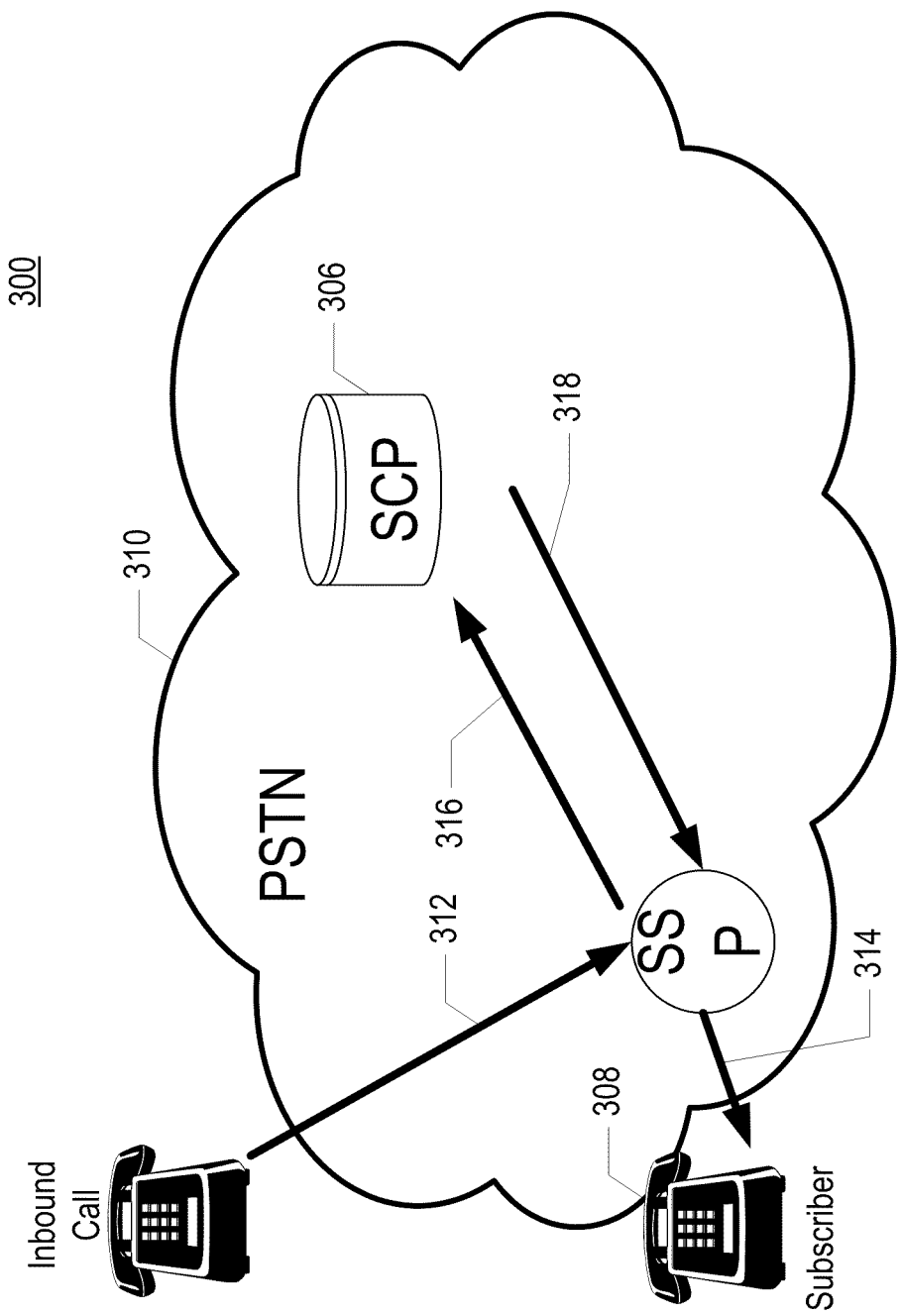
FIG. 3 is a general diagram that illustrates an advanced intelligent network system handling call forwarding using a redirecting number.

Referring to FIG. 3, an illustrative system is shown. The system includes the public switched phone network 310 and intelligent network elements, such as the SSP 304 and the SCP 306. The SSP 304 sends a request message 316 to the SCP 306 and receives an instruction message 318. The request message includes the redirecting number and the instruction message includes a distinctive ring or call waiting tone to be applied to a forwarded call from an inbound caller 302 to a destination 308.

During operation, a caller dials the subscriber phone number to place a call 312. The SSP 304 initiates a termination attempt trigger and sends a termination attempt query 316 to the SCP 306. The query includes the subscriber's telephone number, the caller's number (if available), and the redirecting number (RDN). The SCP 306 receives the query message and formulates a response message. The response message is formulated based on the following criteria:

For the user interface case where any forwarded call activates the distinctive ring tone, the SCP looks at the inbound call information. If it contains a redirecting number (RDN), the distinctive call waiting tone should be applied to the call. Otherwise, a normal call waiting tone will be applied to the call.

For the user interface case where only specific forwarded numbers activate the distinctive call waiting tone, the SCP looks at the inbound call information. If the inbound call contains a redirecting number (RDN) that matches a number in the distinctive ring/call waiting tone activation number list, the distinctive call waiting tone should be applied to the call. Otherwise, a normal call waiting tone will be applied to the call.

Based on the evaluation of the RDN, the SCP 306 sends the response message 318 (such as an authorize termination response message) back to the SSP 304. The response instructs the SSP to set the distinctive ring/call waiting tone on the subscriber line and to continue with the call. Where there is no RDN or if the distinctive ring/call waiting tone feature is not applicable, the SCP 306 sends a response message to continue with the call. The call 314 is routed to the subscriber 308, and the SSP 304 applies a distinctive ring/call waiting tone on the subscriber line if instructed to do so by the SCP 306. Otherwise, a normal ring tone is applied to the line.

Figure 4:
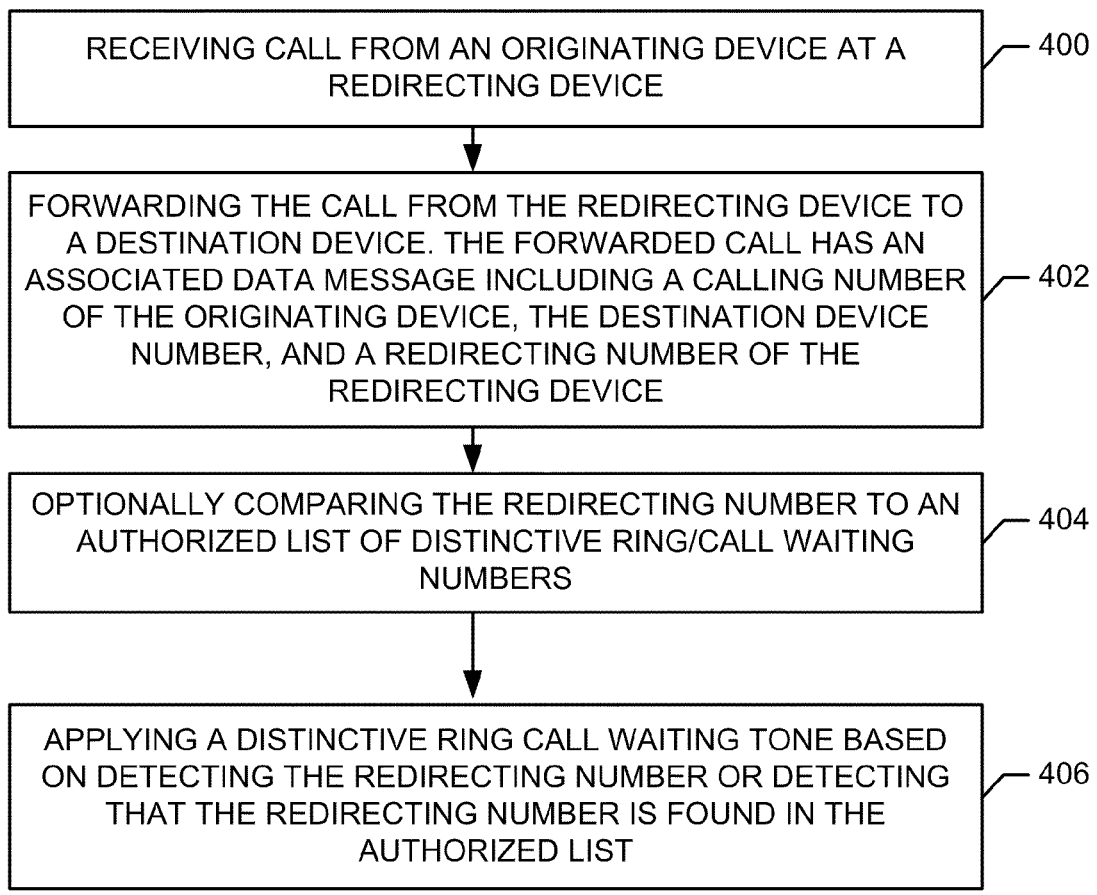
FIGS. 4 and 5 are flow charts that illustrate methods of forwarding calls using a redirecting number and distinctive call waiting tones.

Referring to FIG. 4, a method of handling a forwarded call and applying distinctive ring tones is shown. A call is received at a redirecting device from an origination device, at 400. For example, this step occurs when a caller dials the subscriber's number. The call is forwarded from the redirecting device to a destination device. The forwarded call has an associated data message that includes the calling number, the destination device number, and a redirecting number of the redirecting device, at 402. The redirecting number may optionally be compared to an authorized list of numbers having the distinctive ring/call waiting tone capability, at 404. If the redirecting number is within the authorized list of numbers, or if the comparison of step 404 is not made, then processing continues to step 406. At step 406, a distinctive ring or call waiting tone is applied to the destination device based on detecting the redirecting number or detecting that the redirecting number is found in the authorized list. In addition, where more than one type of distinctive ring tone is available, the particular distinctive ring tone is determined based on the particular redirecting number and the selected distinctive ring tone is applied. For example, a first distinctive ring tone may be associated with a first subscriber phone, such as cellular phone, and a second distinctive ring tone may be associated with a subscriber's work phone number.

Figure 5:
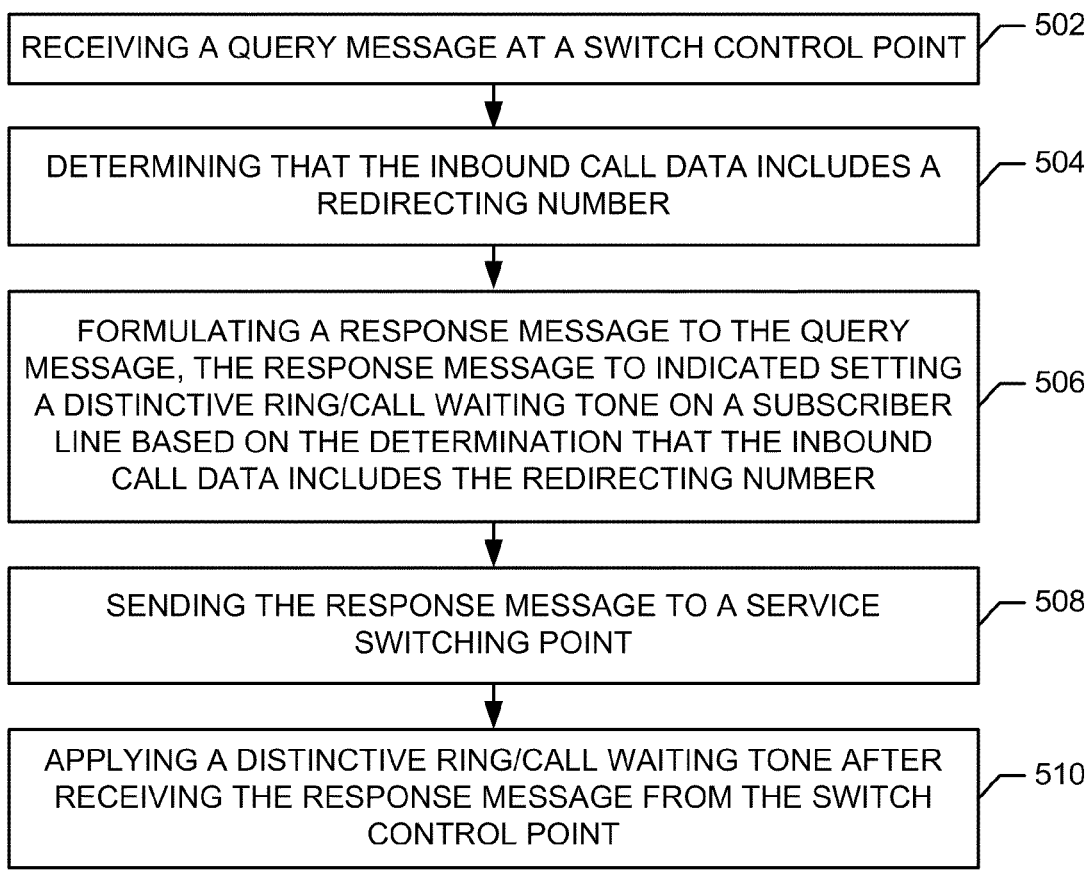

Referring to FIG. 5, a method of processing an intelligent network communication is disclosed. A query message is received at a switch control point, as shown at 502. The inbound call is evaluated to determine whether the call has a redirecting number, at 504. A response message is formulated to the query message. The response message is set to indicate a setting for a distinctive ring/call waiting tone for a particular subscriber destination line. The particular type of ring/tone is based on the redirecting number, as shown at 506. The response message is sent to a service switching point, at 508, and a distinctive ring or call waiting tone is applied to the subscriber destination device after the response message is received from the switch control point, at 510.

While a particular illustrative embodiment of an intelligent network system has been described, a similar system may be implemented using a telephony switch or PBX based feature. In a voice over internet protocol (VoIP) type of system, the disclosed functionality may be implemented in a soft switch. Also, although the system has been described with respect to wireline phones, the system is also applicable to wireless carriers and suppliers of wireless networks. Also, while end-to-end SS7 connectivity has been shown, the service does not require the original caller's switch to have end-to-end SS7 connectivity with the subscriber's serving switch.

The disclosed system provides benefits such as allowing subscribers to identify inbound forwarded calls by listening to the call waiting tone or the type of ring tone. Also, telephony carriers can offer a new service to subscribers without the burden of using additional telephone numbers. Thus, an improved system and method relating to distinctive ring and call waiting tones has been disclosed.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a controller communicatively coupled to a destination device, a query message including inbound call data associated with a call to the destination device;
   determining, based on the inbound call data, whether the call to the destination device is from a redirecting number;
   comparing, at the controller, the redirecting number to an authorized set of numbers;
   determining a usage status of the destination device;
   when the authorized set of numbers includes the redirecting number, formulating a response message to the query message, wherein the response message identifies a distinctive tone of a plurality of distinctive tones to use at the destination device, the distinctive tone indicative of the redirecting number; and
   sending the response message as a reply to the query message;
   wherein the distinctive tone includes a distinctive ring tone associated with the redirecting number when the usage status is that the destination device is not in use, wherein the distinctive ring tone includes a first distinctive ring tone when the redirecting number is a wireless telephone number associated with a user of the destination device, and wherein the distinctive ring tone includes a second distinctive ring tone when the redirecting number is a work telephone number associated with the user of the destination device; and
   wherein the distinctive tone includes a distinctive call waiting tone associated with the redirecting number when the usage status is that the destination device is in use, wherein the distinctive call waiting tone includes a first distinctive call waiting tone when the redirecting number is the wireless telephone number, and wherein the distinctive call waiting tone includes a second distinctive call waiting tone when the redirecting number is the work telephone number.

2. The method of claim 1, wherein the destination device is a telephone associated with the user.

3. The method of claim 2, wherein the telephone associated with the user is a residential telephone of the user.

4. The method of claim 1, wherein the controller is signaling system 7 compatible.

5. The method of claim 1, wherein when the redirecting number is not included in the authorized set of numbers, the response message formulated by the controller identifies a normal ring tone when the destination device is not in use and identifies a normal call waiting tone when the destination device is in use.

6. The method of claim 1, wherein the controller is in a voice over internet protocol type system.

7. The method of claim 1, wherein the controller is in a private branch exchange type system.

8. A system comprising:
   a switching control point; and
   a service switching point coupled to the switching control point;
   wherein the service switching point is configured to send a request message to the switching control point, the request message including at least a redirecting number and a destination number; and
   wherein the switching control point is configured to send a response message to the service switching point in response to the request message, wherein the response message identifies a distinctive tone of a plurality of distinctive tones to use at a destination device associated with the destination number, wherein the distinctive tone includes a distinctive ring tone associated with the redirecting number when the destination device is not in use, and wherein the distinctive tone includes a distinctive call waiting tone associated with the redirecting number when the destination device is in use.

9. The system of claim 8, wherein the service switching point is coupled to the destination device associated with the destination number.

10. The system of claim 8, wherein the service switching point applies the distinctive tone to the destination device associated with the destination number.

11. The system of claim 8, wherein the distinctive tone identifies a particular redirecting number.

12. A system comprising:
   a call facilitating module; and
   a call logic module coupled to the call facilitating module;
   wherein the call facilitating module is configured to send a request message to the call logic module, the request message including at least a redirecting number and a destination number;
   wherein the call logic module is configured to send a response message to the call facilitating module;
   wherein when a destination device associated with the destination number is in use, the response message identifies a distinctive call waiting tone to apply to the destination device associated with the destination number, wherein the distinctive call waiting tone is determined based on the redirecting number; and
   wherein when the destination device is not in use, the response message identifies a distinctive ring tone of a plurality of distinctive ring tones to apply to the destination device, wherein the distinctive ring tone identifies the redirecting number.

13. The system of claim 12, wherein the destination device is a phone.

14. The system of claim 13, wherein the phone is a residential telephone.

15. The system of claim 12, wherein the call logic module is signaling system 7 compatible.

16. The system of claim 12, wherein when the redirecting number is not included in an authorized set of numbers, the response message identifies a normal ring tone when the destination device is not in use and identifies a normal call waiting tone when the destination device is in use.

17. The system of claim 12, wherein the call logic module is in a voice over internet protocol type system.

18. The system of claim 12, wherein the call logic module is in a private branch exchange type system.

* * * * *